Fig. 3.

INVENTOR

Sept. 1, 1959 F. A. PURDY 2,902,276
DOOR-OPERATORS AND CONTROLS
Filed Dec. 13, 1956 9 Sheets-Sheet 5

INVENTOR

Sept. 1, 1959 F. A. PURDY 2,902,276
DOOR-OPERATORS AND CONTROLS
Filed Dec. 13, 1956 9 Sheets-Sheet 9

INVENTOR

United States Patent Office
2,902,276
Patented Sept. 1, 1959

2,902,276

DOOR-OPERATORS AND CONTROLS

Frederick A. Purdy, Scarsdale, N.Y.

Application December 13, 1956, Serial No. 628,036

10 Claims. (Cl. 268—1)

The present invention relates to door-operators and controls therefor, and has particular reference to devices for opening, closing, and controlling the operation of doors of garages, residential and commercial.

The invention embodies improvements upon, or alternatives to, devices disclosed in my prior Patents 2,062,015, issued November 24, 1936; 2,127,376, issued August 16, 1938; 2,689,724, 2,689,725, and 2,689,726, issued September 21, 1954; and 2,758,836, issued August 14, 1956; also devices described in my pending applications, Serial Number 287,167, filed May 10, 1952, now Patent No. 2,850,088, issued September 2, 1958; Serial Number 526,035, filed August 2, 1955; and Serial Number 589,910, filed June 7, 1956.

*Objects of invention*

Objects of the invention are:

The use of a timing means of readily controlled precision in cancelling the effectiveness of sunlight, lightning, and other sporadic light, upon a cell responsive electrically to light, distinguishing from applied light, as from an automobile headlamp light-beam, which may be extinguished at will.

Introduction of a clutch between a timing-clock and parts driven thereby, to facilitate actuation by de-clutching, and to permit of applying the clock to function independently of the driven parts.

Termination of periods of headlamp ineffectiveness, as a supplementary function of the timing-clock.

Protection of motor against overheating, as a supplementary function of the timing-clock.

Protection of an automobile, by capacitance, against door-movement while the automobile is passing through the doorway, or about to pass through.

Application of a retracting drive upward, upon a downward-moving door arrested by capacitance between an antenna and a car passing through doorway.

Cushioned stoppage of door-movements, retarded to avoid slamming or shock at the termination of the opening movement and of the closing movement, permitting of higher speed in the door-drive.

Use of a cable-gripping sheave for direct drive upon door in closing as well as in opening.

These and other objects, to attain convenience, safety, economy, simplicity, precision, and dependability, will appear in the development of the description.

*Definitions*

For the purposes of this description, the terms "right-hand" and "right-hand wall" are defined as at or toward that side of the garage which is to the right-hand side of an automobile headed into garage; "left-hand" and "left-hand wall" at or toward the left-hand side of the automobile; the terms "left," "leftward," "right," "rightward," "up," "upward," "down" and "downward" apply upon the face of the drawing under consideration; the term "rearward" is defined as the direction parallel to right-hand and left-hand walls, in which an automobile would move entering garage; "forward" as the direction parallel to the right-hand and left-hand walls, in which an automobile would move backing out of the garage. The terms "set off" and "setting off" are defined as meaning to initiate movement, putting specified parts into action.

*Drawings*

The accompanying drawings show, for purposes of illustrating the present invention, one embodiment in which the invention may take form, together with the modification of certain parts, it being understood that the drawings are illustrative of the invention rather than limiting of the same.

*General observations*

Figure 1:
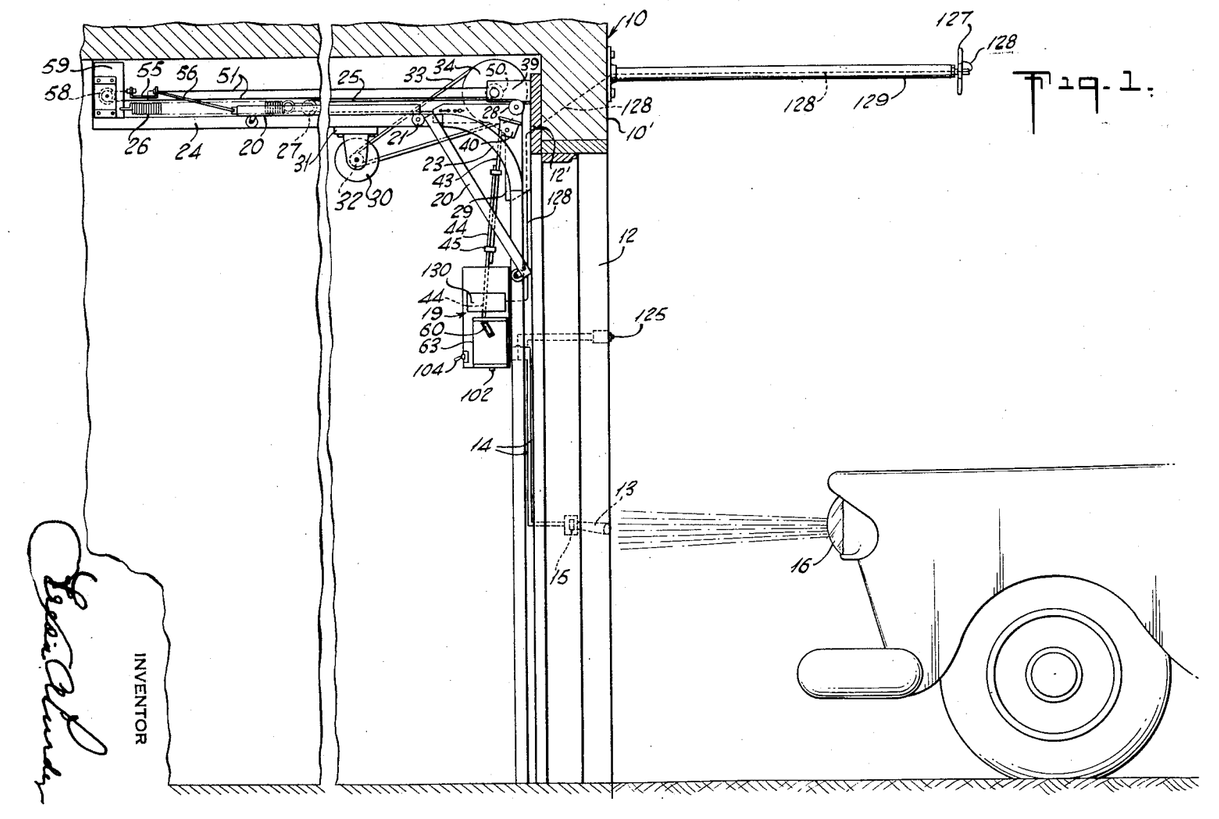
Figure 1 is an elevation-view toward the right-hand side of a garage-doorway, showing relative locations of door-operating and control devices, and door in partly open position.

In Figure 1, a door-jamb 12, in a garage-structure 10, has imbedded in it (at the level of an automobile headlamp 16) a cylinder 13 which contains a light-sensitive cell 15 of the kind which responds electrically to applied light. The headlamp beam is received through the forward end of cylinder 13; through the rearward end, two wires 14 from the cell run to the coil of a double contact relay 120 (Figs. 4 and 5) in cabinet 19 (Fig. 1). A push-button 125 imbedded in jamb 12 is shunted across the wires 14 with a resistor to protect the cell.

The cell 15 hereinafter called also "light sensitive cell," may be any suitable device which, when lighted, provides for the flow of electric current to the relay 120, and, when dark, reduces or terminates such flow. It may be a crystal, such as shown by John Hofer in patent application filed Dec. 7, 1954, Serial No. 473,572; or it may be a self-generating or voltaic cell having a light sensitive material bonded to a metal disc which generates electric current when lighted; or it may be a junction-type semi-conductor, such as shown by J. N. Shive in Patent 2,641,713, issued June 9, 1953; or it may be any other device adaptable for the purpose.

A capacitance protective antenna 127 is held by, and insulated from, bracket 129 mounted on lintel 10' at mid-point above doorway. Wire 128 leads from the antenna to a capacitance-set 130 within cabinet 19.

Figure 4:
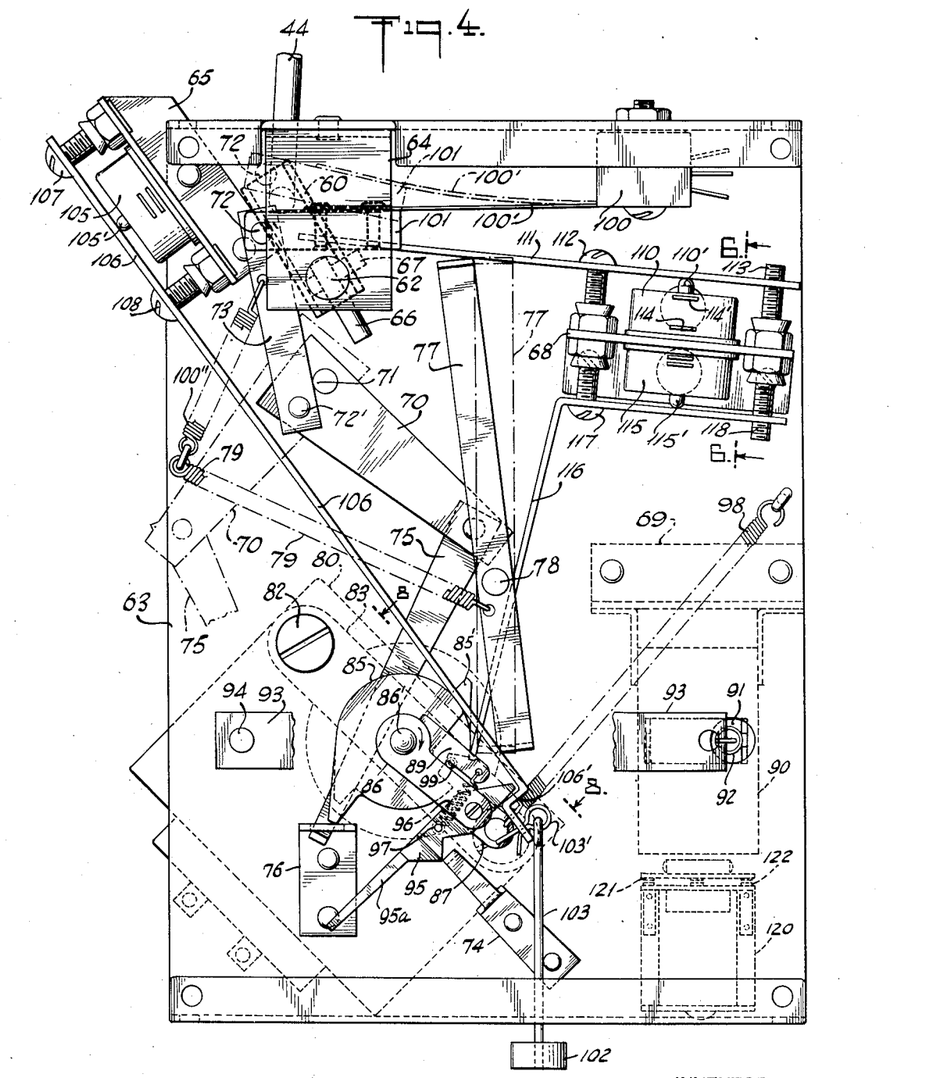
Figure 4 is a face view of a control-assembly as seen in the same direction as Figure 1, with parts in position as when door is closed.
Figures 5, 6, 7:
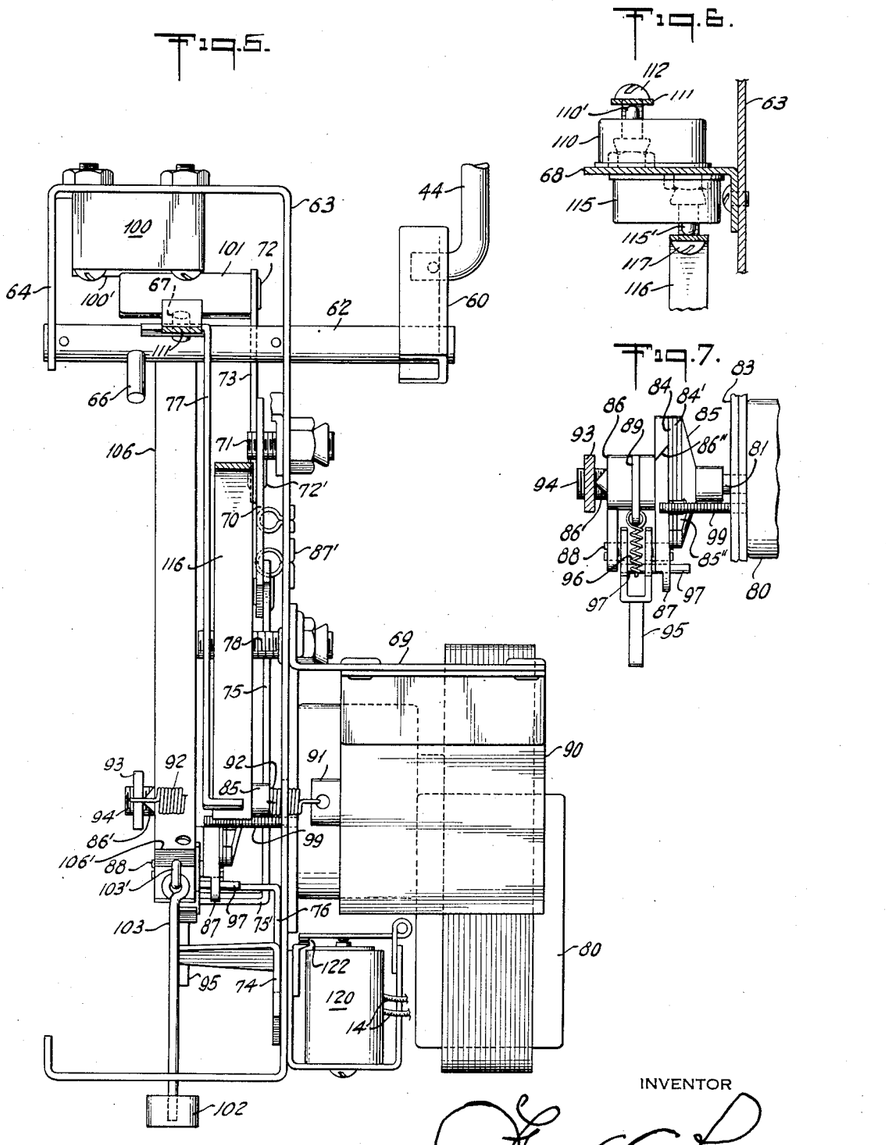
Figure 5 is a side view of Figure 4, with parts in position as when door is closed.
Figure 6 is a section on lines 6—6 of Figure 4.
Figure 7 is a fragmentary view of a portion of Figure 5.

Means for cancelling sunlight or other sporadic light, and controls for other purposes, are included in the control-assembly, Figs. 4 and 5, mounted on a frame 63, which may be positioned suitably in relation to a garage-door, as is the box designated 63 in Figure 6 of my application Serial Number 589,910, filed June 7, 1956, for a roll-over door of slats hinging together, or as here shown within cabinet 19 in relation to a roll-up door of wood. An arm, identified as 60 in both this application and that of Serial 589,910, swung clockwise as door approaches termination of its closing movement, and swung counter-clockwise as door approaches termination of its opening movement, has the same function, and the same relation to door-operation, in both this application and that of Serial 589,910.

Figure 2:
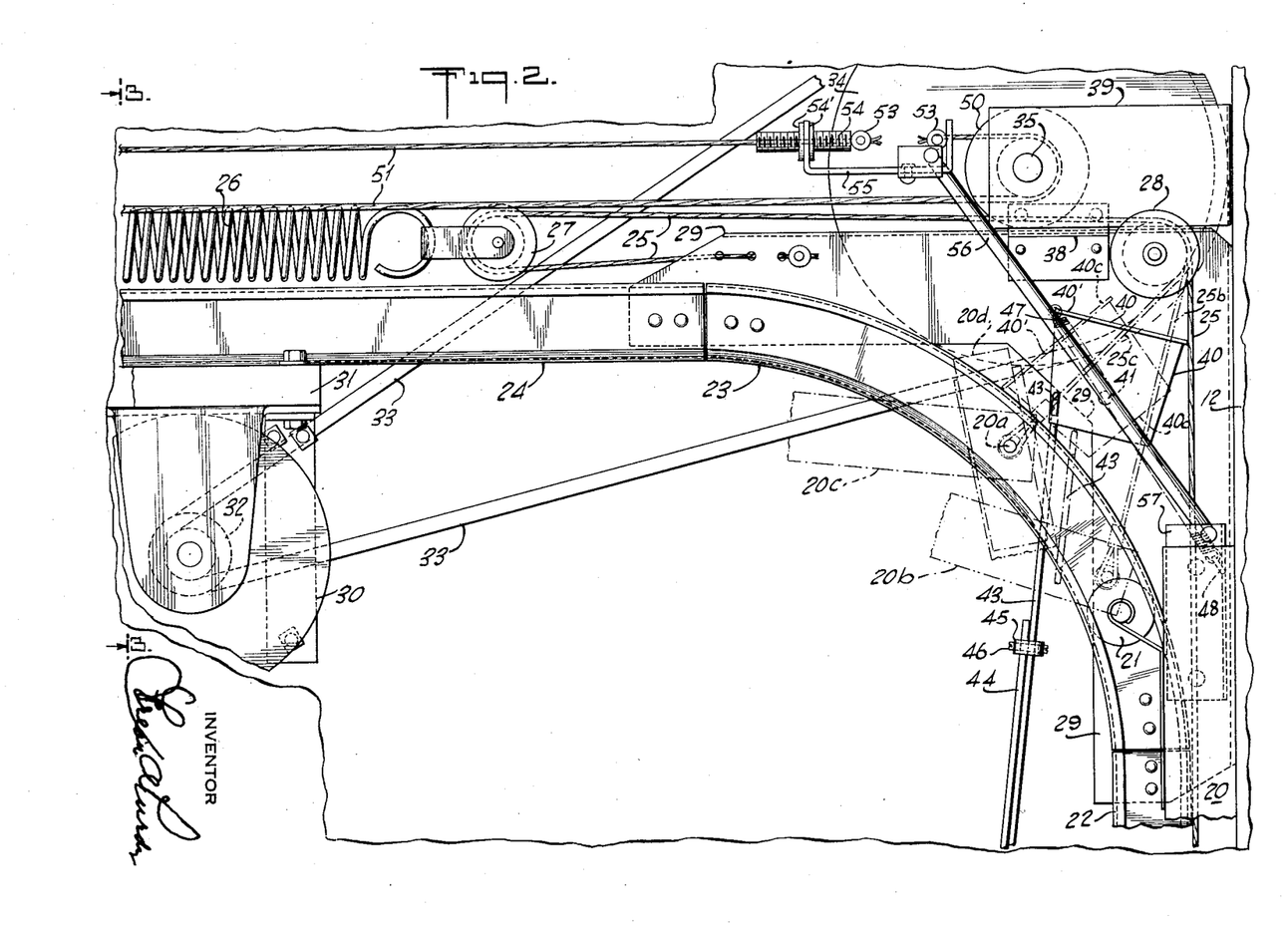
Figure 2 is a detailed view of the motor drive and controls as seen in the same direction as Figure 1, with door in fully closed position.
Figure 3:
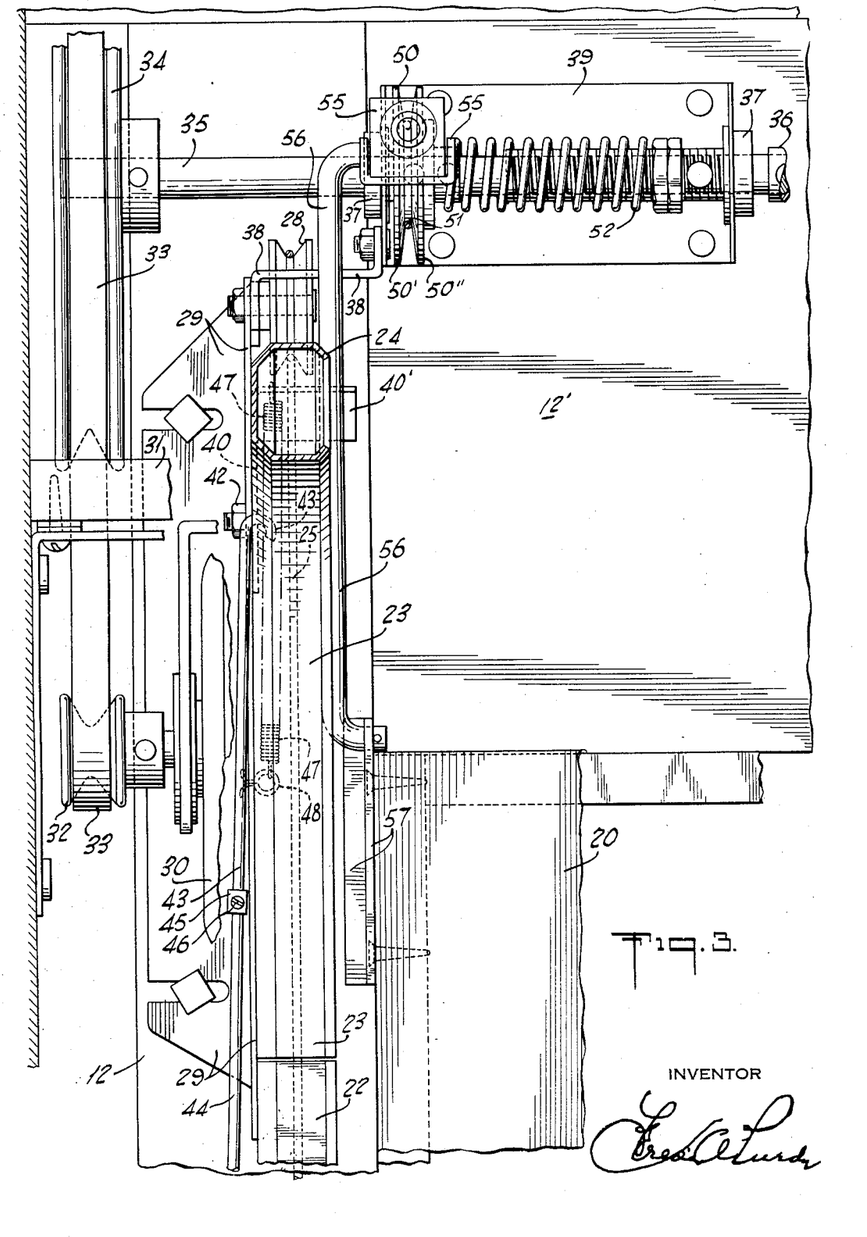
Figure 3 is a section on line 3—3 of Figure 2, with door in fully closed position.

Door 20, shown in partly opened position in Fig. 1, and in closed position in Figs. 2 and 3, is the conventional wood-door of the type called "roll-up," comprising a number of rigid sections with hinges joining them, each hinge carrying a roller such as 21 to support and guide the door-sections in vertical tracks, such as 22, either side of doorway, mounted to brackets 29 and to door-jamb, in curved tracks 23 on brackets 29, and in horizontal tracks 24 supported forward by brackets 29 and rearward by ceiling-supports 59 (Fig. 1); the door being counterbalanced by two horizontal springs 26, one adjacent to and substantially parallel with each horizontal track, each spring 26 being attached at its rearward end to the ceiling-support 59 of its adjacent track, and having, yoked to its forward end, a pulley 27 around which runs a cable 25 from anchorage on bracket 29 through pulley 27, over sheave 28 on bracket 29, and down to a cable-anchorage 20a on bottom of door, observable at 20b and 20c, Fig. 2.

Motor 30, held by shelf 31 on garage-wall, drives the grip-sheave 50 and shaft 35 through pulley 32, belt 33 and pulley 34. Pulley 33, shaft 34, and sheave 50 are supported by ball-bearings 37, 37, in bracket 39 braced by bracket 38 from bracket 29 and fastened to header-facing 12'.

Drive-cable 51, running over grip-sheave 50, extends rearward and over pulley 58 on rear end support 59 (Fig. 1), and this cable is given an endless-belt effect by connecting its ends into a coupling 55, as by anchorages 53, 53, one end of the cable 51 being adjustably connected to the coupling 55 by a nipple 54 and lock-nuts 54'. Drive-rod 56 connects from coupling 55 to striker 57 fastened to top of door. A drive by grip-sheave 50 to move cable 51 moves the door to its open and closed positions, through coupling 55 and rod 56.

Grip-sheave 50 is of the kind appearing in my Patent 2,758,836, issued August 14, 1956, in two parts, one 50' (Fig. 3) shouldered to carry cable 51, and one 50" pressed by spring 52 against cable 51 frictionally to drive the cable and the door. Such a sheave may be used at one side of the doorway, and compensation made at the other side by adjustment of tension in counterbalancing spring. For heavier doors, and for those having worn, rusted, or otherwise resistant hardware, a pipe, as 36, Fig. 3, connected to shaft 35, may be put across the doorway to connect with a corresponding shaft in a similar sheave-and-bracket assembly (without a pulley corresponding to 34) mounted in the same way at the opposite side of the doorway, and carrying and moving a cable at that side in unison with cable 51.

Application of the grip-sheave as here shown is new, and meets a need. Door-hardware that includes short curved tracks, such as 23 in Figure 1, designed to fit where garage-ceilings are low, is being sold currently by one of the large mail-order houses. In Figure 1, track-roller 21 hangs on horizontal track 24, while door has all sections but one dragging on the horizontal track, and has normal resistance of counterbalancing springs. A downward pull by hand meets with resistance, and users must reach seven feet up to press outward on a handle fastened to the next door-section. A door-operator is needed to push from the rear end of door.

With longer curved tracks, as more generally used in the past, roller 21 is already into the curve when the bottom section of the door reaches the angle shown in Figure 1, and the weight of this bottom section pulls the remainder of the door downward. A grip-sheave then needs only to draw cable away from the counter-balancing springs to free the door to close by gravity. Since this condition does not apply with the shorter curved track, cable 51 must make a positive push to substitute for gravity.

This could be done with grip-sheave 50 combined with sheave 28, except that a speed-reducing sheave such as 34 would not fit into the space available without a groove for it being cut out of the front wall of garage, some front walls having the thickness of a single board.

Cable-grip traction is doubled in this design to 180° of the sheave's bearing surface.

*Cushioning of door-stoppage*

A switcher 40 (Fig. 2) pivoting on thread of pivot-stud 41, threaded into bracket 29 and held by lock-nut 42 (Fig. 3), governs arm 60 and cam-shaft 62 (Fig. 4) by a link of two rods 43 and 44 respectively engaged pivotally between switcher 40 and arm 60. Rods 43 and 44 are adjustable as to their combined length, and are held together, by clamps 45 and set-screws 46. A spring 47, attached to a hole in flange 40' of switcher 40, extends to cotter-pin 48 stationary on bracket 29. The purpose of the switcher is to initiate movements, later observed, to de-energize door-drive motor 30, and reverse its polarity, at a suitable distance from the door's open or closed position.

Switcher 40 is shown in closed-door position in which it is stopped against bracket 29 by the end of rod 43 extending through the switcher 40 and is in contact with cable 25, to which position it is biased by spring 47 tending to rotate the switcher 40 clockwise about the pivot-stud 41 in Figure 2. It is thrown into position 40c as indicated by broken lines in Figure 2, when door approaches opened position.

Below sheave 28, cable 25 is vertical while door is closed and until door approaches or leaves its opened position. In opened position of door, cable 25 slants rearward as shown by broken lines 25b and 25c, Figure 2. In position 25b the slant is sufficient to tip switcher 40 far enough leftward of Figure 2 to bring spring 47 leftward of pivot 41, and to permit spring 47 to snap switcher 40 into position 40c (where it stops on top of track 23) throwing rods 43 and 44 downward, and effecting a de-energization of motor 30. This snap into position 40c occurs when bottom of door is in position 20b, some distance from fully opened position. The door continues to position 20c under momentum, but subject to the retarding effect of its driving the de-energized motor through the speed reduction steps of belt and pulleys. The retardation avoids a recoil and shaking of a door moving at a fair speed and biased upward by counterbalance springs adjusted to favor a ready lift out of closed position.

Striker 57 fastened to door 20 at door's upper corner, extends beyond the edge of the door to come into contact with flange 40' of switcher 40 and to start flange 40' rightward of Fig. 2 as door comes down into position 20d.

As the door moves further closed and striker 57 escapes flange 40', rod 56 comes into contact with the flange to move switcher 40 into its "closed-door position." The move of switcher 40 into closed-door position lifts rods 43 and 44 to effect a lift of arm 60, a de-energization of motor 30, and a reversing of the motor's polarity. But the motor is de-energized, and its polarity reversed, as described under "Operation—Cushioning of door-stoppage," when switcher has passed through the first one-eighth of this movement, with top of door in position 20d, several inches above fully closed position. The door continues under its momentum into its fully closed position, solid lines of Figure 2, but is retarded in speed, and prevented from slamming, by its driving of the de-energized motor through the speed reduction steps of belt and pulleys.

The reversing of motor-polarity before door reaches fully closed position provides that the next movement of door will be upward in case door should be obstructed from closing fully, as by a stone dropped from a tire or otherwise, or by leaves packed on the sill, or by packed snow, or by garden-hose, or a tool-handle.

*Devices within cabinet*

Referring to Figures 4 and 5, arm 60 is pinned to cam-shaft 62 which journals in holes punched in frame 63 and in bracket 64 attached to frame 63. Actuated by switcher 40, this arm 60 swings through an arc of 120°, from its position in Figure 4 counterclockwise when door approaches open position, and returns clockwise when door approaches closed position. Pins 66 and 67, press-fitted into holes drilled in cam-shaft 62 act as cams.

Cam 66 engages a pad 101 riveted to leaf-spring handle 100' of a reversing switch 100, mounted to frame 63 as shown.

Cam 67 lifts lever 111 to throw switch 110 (mounted by bracket 68 to frame 63) and recedes from that lever in the swing-through of arm 60 each way, leaving the lever held upward by latch 77. Latch 77 pivots freely on stud 78, and is biased by spring 79 to hold lever 111 upward, and switch 110 thrown, until latch 77 is disengaged by one of the horns 85' of horn-disc 85 about to be observed.

A rocker 70, pivotally mounted on stud 71 suitably held in frame 63, is connected to pad 101 by link 73, the pins 72 and 72', in which link, permit free pivotal movement at rocker and pad.

A tappet 75, pivots at one end freely on rocker 70, and at its other end is embraced within a hole punched in bracket 76 riveted to frame 63.

Timing-clock 80 is a standard type having a synchronous motor driving a non-reversible shaft 81, clockwise. A preferred speed at shaft 81 is one revolution per minute.

The value of a timing-clock is in its precision and dependability to hold to its rated speed under varying conditions, so that a user of a door-operator may not have to change his setting-off practice with changes in weather or other conditions. A chamber for timing by movement of air or liquid is not uniform in its time-periods at temperatures that range between 90° above zero and 10° below. Shrinkage changes occur in a metal piston, allowing more air to pass, the colder the weather. A piston of leather or plastic reduces, with cold, in pliability for air-sealing. Liquids lose in viscosity with cold.

Timing-clock 80 is held by screws 82 through frame 63 into the clock's screw-plate 83. Shaft 81 extends through frame 63 to carry by a press-fit a horn-disc 85. Upon the hub of horn-disc, a pawl-carrier 86 rides and rotates freely. From hub to periphery, the horn-disc presents a flat circular area to a corresponding area of the pawl-carrier; upon each of these areas is cemented a washer-shaped facing 84, 84', Figures 7 and 10, of frictional material for dry-plate clutching. A clutching-lever 93, loosely held at one end by stud 94 in frame 63, connects at its other end through spring 92 to plunger 91 of a solenoid 90 mounted by bracket 69 to frame 63. Clutching lever 93 faces pin-point 86' of pawl-carrier, Figure 5. When solenoid is energized the lever presses the pawl carrier to clutch with, and to turn with, the horn-disc. In the absence of pressure from solenoid, the pawl-carrier and horn-disc may turn free of each other.

Figures 8, 9, 10, 11:
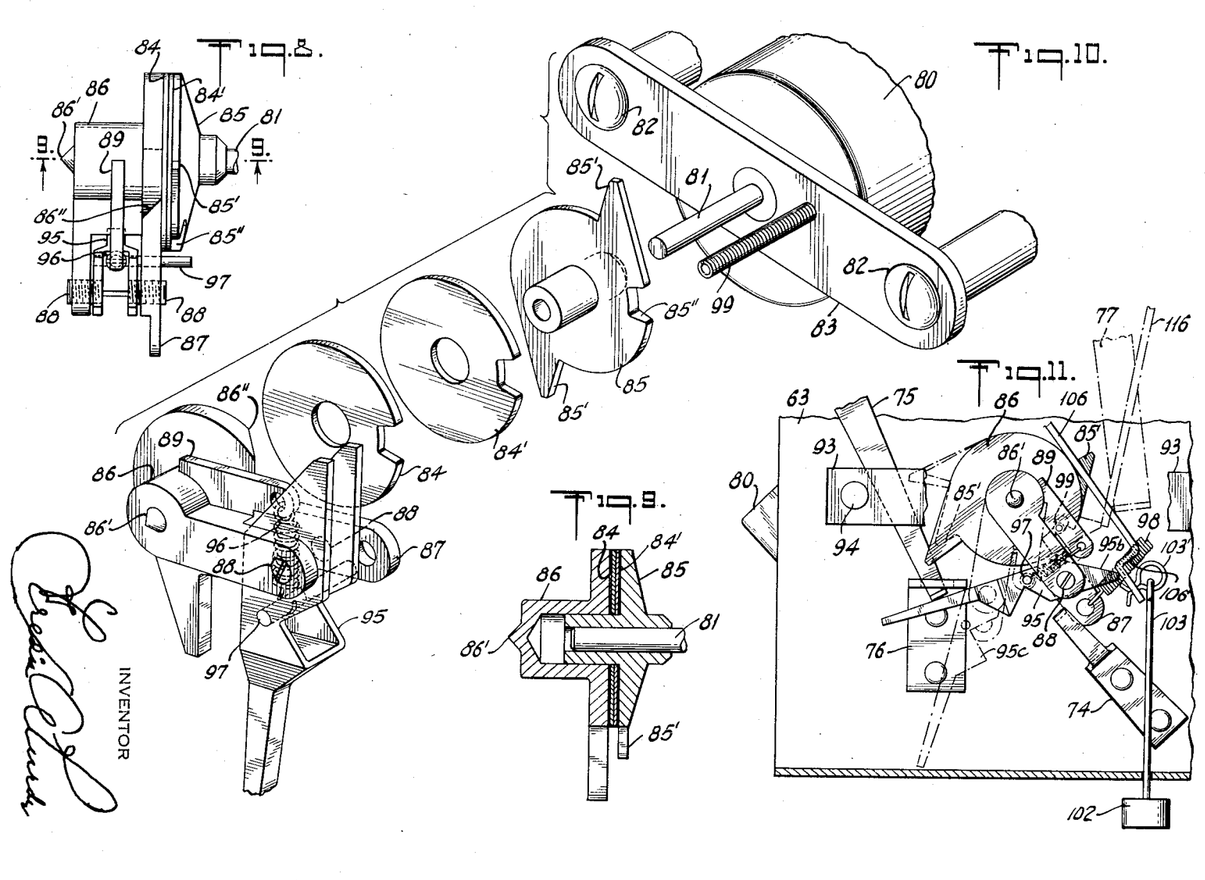
Figure 8 is a fragmentary section on line 8—8 of Figure 4.
Figure 9 is a section on line 9—9 of Figure 8.
Figure 10 is an exploded perspective view of timing-clock and clutch mechanism.
Figure 11 is a fragmentary view of the lower left corner of Figure 4 with some parts in moved position.

A bifurcated pawl or engager 95 pivots on screws 88 between arms 87 of pawl-carrier, and it is subject to control by spring 96 (within the bifurcation) extending from a pin 97 across pawl to a finger 89 on pawl-carrier, so that the spring 96 causes the pawl to tend toward positions as at 95a, Fig. 4, and 95b, Fig. 11, in which a straight line between spring-ends is above pivots 88; or toward a position as shown in broken lines at 95c, Fig. 11, in which a straight line between spring-ends is below the pivots. Pin 97 extends rightward of Figures 5 and 8 into the path of horns 85'. Pawl-carrier 86 is biased by spring or retractor 98, Fig. 4, for return of pawl to position 95a, Fig. 4, when not under clutch influence. Bracket 76 serves to tip pawl 95 into position 95c, Fig. 11, whenever the pawl is moved far enough clockwise to reach that bracket. Tripper 74 on frame 63 tips pawl back into position 95a whenever pawl-carrier brings the pawl from position 95c rightward of Figure 5.

*Electric switches, relay and circuits*

Figure 16:
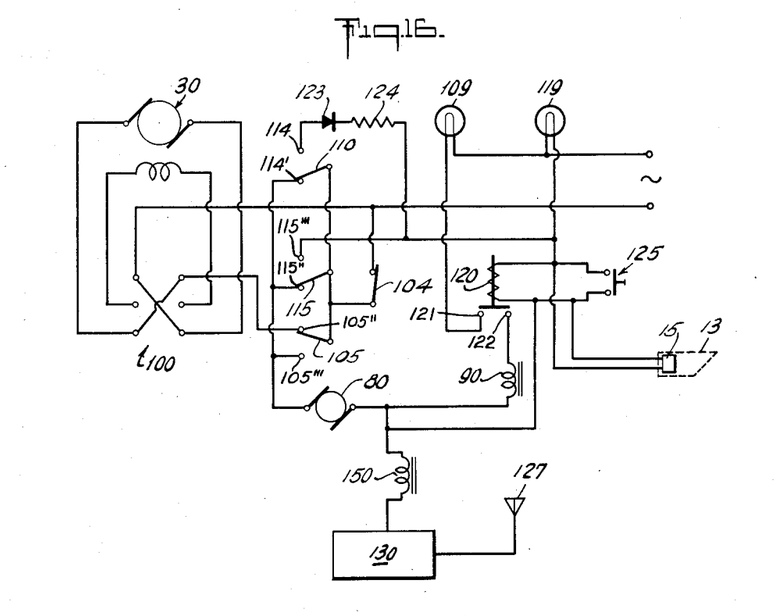
Figures 16 and 17 are wiring diagrams.

All current is supplied through master-switch 104, Figs. 1 and 16. The opening of this switch for a period, as for overnight, serves to immobilize the electric equipment.

Reversing switch 100, of standard character (Acro 2POBDR) mounted on frame 63 as shown in Figure 4, and wired to door-drive motor 30, is schematically indicated in wiring-diagram, Figure 16. Its handle 100' is a leaf-spring which may be pressed upward, broken lines, Figure 4, as by cam 66, into position which it holds while door is open, in which the polarity of motor 30 is such as to drive door downward; this handle returning to normal position (solid outline, Figure 4) as when free of cam 66 with door closed, in which position the polarity of motor 30 is such as to drive the door upward. The spring-stress in handle 100' for return to normal is supplemented by a spring 100''.

Switches 105, 110, and 115, held on brackets to frame 63 as shown, are the same in size and construction, with rating of 10 amperes at 110 volts A.C. Respective buttons 105', 110', and 115' are spring-pressed from within to recover from pressure upon them inward of switch-body. Respective levers 106, 111, and 116, by which the respective switch-buttons are pressed are fulcrumed under respective screw-heads 107, 112, and 117, held in standard flexlock nuts clinched in and riveted to respective brackets, and are held in line by studs 108, 113, and 118 respectively.

At normally open position, single-throw, double pole, switch 105, having two insulated contacts 105'' and 105''', mounted by bracket 65 to frame 63, lever 106 is moved rightward of Figure 4 by pawl 95 when the release of clutch frees pawl-carrier 86 to retract counter-clockwise under stress of spring 98. At this switch the lever's fulcrum is screw-head 107, so that rightward movement throws button 105' to close the switch. Screw 108 confines lever 106 in line for contact by pawl 95, and its head retains the lever from following pawl when pawl-carrier moves clockwise to carry the pawl off shelf 106'. Throw of button closes circuit to pass current from one tab to door-drive motor 30 through contact 105'', and from the other tab to timing-clock 80. Thus timing-clock runs at all times when motor 30 runs. But when switch 105 is open, that is connected to contact 105''' current otherwise supplied at timing-clock 80 can not get across to motor 30.

At single-throw, double-pole switch 110, lever 111 is lifted by cam 67 against fulcrum 112, resulting in pressure on button 110' inward of switch-body to close the circuit through tab 114'. Upon release of pressure the switch restores its normally closed circuit through tab 114, passing alternating current to rectifier 123, the output of which, smoothed by resistor 124, and passing through cell 15 or push button 125, energizes the coil of relay 120, having dual contacts 121 and 122, Fig. 4. Thus a closing of the relay by energization of relay-coil through cell 15 or through push-button 125 results in actuation of solenoid to clutch the horn-disc 85 and pawl-carrier 86, and in actuation of timing-clock to rotate these members. Throw of switch 110 by lifting of lever 111 when door approaches open or closed position, opens the circuit through tab 114 and renders headlamp-beam to cell 15 and the push-button 125 ineffective upon solenoid and timing-clock. But such throw of switch 110 closes the circuit through tab 114' to restore current to timing-clock 80 (but not to solenoid) to rotate horn-disc 85 independently of solenoid and clutch.

At normally open, single-throw, double-pole, switch 115, having two insulated contacts 115" and 115"', mounted with switch 110 by bracket 68 to frame 63, lever 116 is moved by either horn 85' of horn disc 85. Lever's fulcrum is at screw-head 117. Pressure of button 115' closes the circuit to pass current through contact 115"' to timing-clock 80 and to warning-signal 119 (Figure 16). This switch is used only in self-closing of door. The warning-signal may be a red lamp, a buzzer or a bell.

A ceiling lamp 109, Fig. 16, in parallel with timing-clock, lights garage whenever timing-clock runs, that is, for a period commencing with starting of door-drive motor.

Self-closing members

A pawl or interposer 99 is used in self-closing of door. This interposer is a coil-spring, of the kind customarily used for extension, which has extreme flexibility for bending in any direction, and resilience for regaining its normal straight line. One end of interposer 99 is press-fitted tightly into a hole in screw-plate 83 of timing-clock 80, and, through a larger hole in frame 63, extends as far as to reach through notches 85" in horn-disc 85, and 86" in pawl-carrier 86 (Figure 10). Interposer 99 bends under horn-disc 85 until the two notches 85" and 86" come into line with it, whereupon notch 85" drives interposer 99 against notch 86" to shift pawl-carrier clockwise without clutching aid, and continues until interposer draws out of engagement.

Remote control push buttons

Push-button 125 and its relation to relay 120 has been observed. Similar remote control may be provided at any convenient location, such as beside a door intercommunicating between garage and house. This may not entail the use of armored cable or the services of an electrician under the national code, as customary in house-wiring. The resistor at the push-button is in the order of 10,000 ohms; current to energize the relay is in the order of two milliamperes.

A push-button 102, operating directly to throw switch 105 and close circuit through contact 105" to door-drive motor, is shown in Figures 4 and 5. Button 102 connects by rod 103, and cotter-pin 103' to the end of switch lever 106. An upward push actuates switch 105 and starts the door-drive motor to open or close. To hold switch 105 closed while the motor runs, lever 106 becomes latched by pawl 95 springing off shelf 106' as the shelf moves away under pressure of push-button 102. To stop motor when door reaches the end of its movement, pawl 95 is unlatched from lever 106 by tappet 75 depressing tail of pawl.

Capacitance safety-devices

Two principal shortcomings in the use of capacitance to set off a door-operator are (1) unwanted actuation of a door by persons walking across the approachway, (2) unwanted door-closing when a car may be passing through doorway, or about to pass through. These and minor inconveniences have led to counter-devices that add more to cost than may be saved by the evident simplicity of a capacitance circuit.

However, while not feasible for the aforementioned reasons as an actuator, a capacitance can be used to interrupt, and even reverse, the normal cycle of operation as hereinafter more fully described.

Devices here shown (1) prevent a downward drive upon door from being started while a car is within capacitance-range of a feeler-antenna; (2) arrest downward movement when car comes within range; or (3) reverse a downward moving door to return upward when car comes within range.

In Figure 1 a feeler-antenna 127 has been observed, with its wire 128 leading to a capacitance-set 130 within cabinet 19. The capacitance-set is detailed in Figure 17, and Figures 12, 13, 14 and 15 show alternative mechanical modifications in the control-assembly, with alternative solenoids energized from the capacitance-set.

Capacity between feeler-antenna and ground increases with proximity of the ground, that is of a body, such as a person or an automobile, standing above the earth surface that normally is the ground. The increased voltage in capacitance between antenna and an automobile as against capacitance between antenna and earth-surface is used to trigger a thyratron tube to operate a sensitive relay to close a circuit to solenoid.

Figure 17:
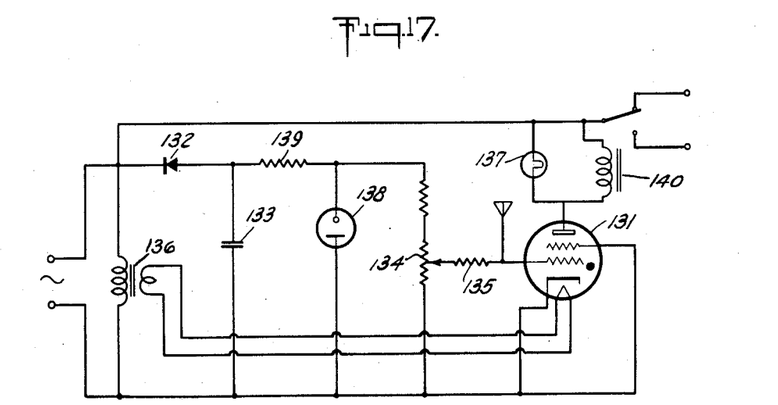

In grid-controlled, thyratron gas, 2D21 discharge tube 131, D.C. grid bias is provided by selenium rectifier 132 and filter capacitor 133. Conduction at this tube is adjusted by 10,000 ohm potentiometer 134 to the verge of firing, so that a small positive voltage impressed on the grid of the tube will cause the tube to fire. Such a voltage is produced by the automobile increasing capacity of the feeler-antenna to ground, causing current to flow through the 3.3 megohm resistor 135. A voltage drop produced by this current fires the tube and the resulting plate current closes the sensitive 5000 ohm relay 136 to energize solenoid 140, in the control-assembly, to stop or reverse motor 30, and the door, as about to be observed.

When the automobile passes out of range of the feeler-antenna, capacity to ground decreases, and tube 131 stops its discharge, permitting regain of control by the grid.

Pilot lamp 137, which offords a sign that capacitance has taken effect, is used to bypass A.C. component to prevent chatter by solenoid 140 that would ensue with A.C. on the plate of the thyratron tube.

OB2 voltage-regulator tube 138 provides constant voltage with resistance at about 108 volts, so that changes in feeding-line voltage do not affect the grid bias of the thyratron tube. Resistor 139, 1000 ohm, 10 w., reduces the rectified voltage to the desired value of tube 138. This voltage is negative and provides a negative bias for the grid of thyratron tube 131.

Figure 12:
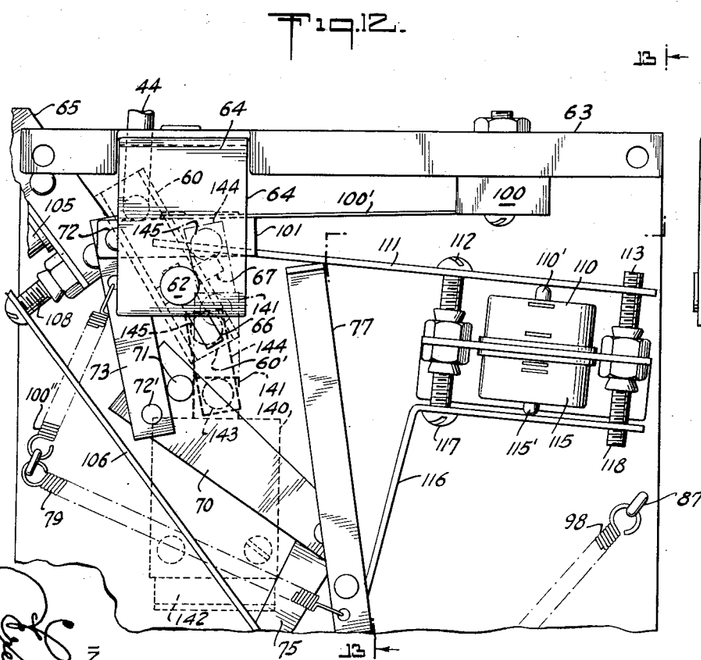
Figure 12 is a fragmentary view, similar to Figure 4, showing a modification which includes a safety device.
Figure 13:
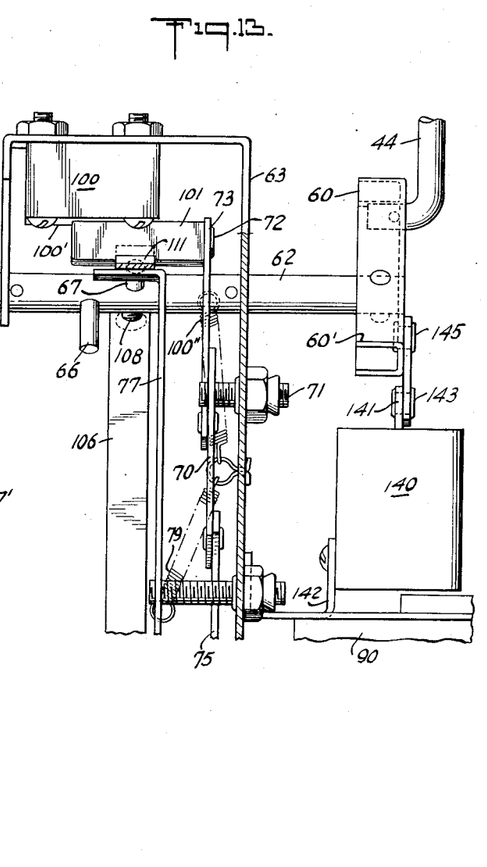
Figure 13 is a section on line 13—13 of Figure 12.

A method of holding the polarity of motor 30 to a door-opening drive when car is within capacitance-range of antenna, is shown in the use of solenoid 140, Figures 12 and 13, mounted by bracket 142 to frame 63. The plunger 141 of solenoid 140 connects by pivot 143 to link 144 which connects by pivot 145 to an extension 60' of arm 60.

Arm 60, as appearing in Figures 12 and 13, is in the position which it takes when door closes fully, in which, with handle 100' of reversing switch 100 in normal downward position, the polarity of motor 30 is such as to drive door upward, the switcher 40 being in the position shown in Fig. 2. During such period of time as solenoid 140 is energized, arm 60 is held to this position, and will not be moved from it by spring 47 on switcher 40, or by the pressure of cable 25 against the switcher. If, however, switcher is in position 40c, and arm 60 has moved cam 66 to lift handle 100' upward, a setting off of a downward movement of door will release the pressure of cable 25 from the switcher 40 before door can move more than a few inches, and solenoid 140 will throw arm 60 and switcher 40 into its closed-door position immediately, shutting off motor 30 through rocker 70 and tappet 75 in the process, and reversing the polarity of motor 30 to make the next drive by motor in the door-opening direction.

Any setting off of the motor while polarity of motor is held by solenoid 140 to the door-opening direction, and while door already is open, will cause frictional slippage at grip-sheave 50, continuing for about 12 seconds until timing-clock brings horn 85' to depress pin 97 in pawl and shut off the motor. De-energization of solenoid 140 when car moves out of capacitance-range with door left in upward position frees arm 60 to move to its normal door-open position under pressure of cable 25 and spring 47 upon switcher 40.

The method of stopping the motor when a car comes within capacitance-range of a door moving downward is that solenoid 140 throws arm 60 clockwise out of its downward (door-open) position, withdrawing cam 66 to release handle 100' to move downward and stop the motor by causing a swing-through of rocker 70 and tappet 75 to disengage pawl 95 from lever 106 and open switch 105, stopping the motor and reversing the polarity of motor so that its direction of drive when next set off will be to move the door open.

Figure 14:
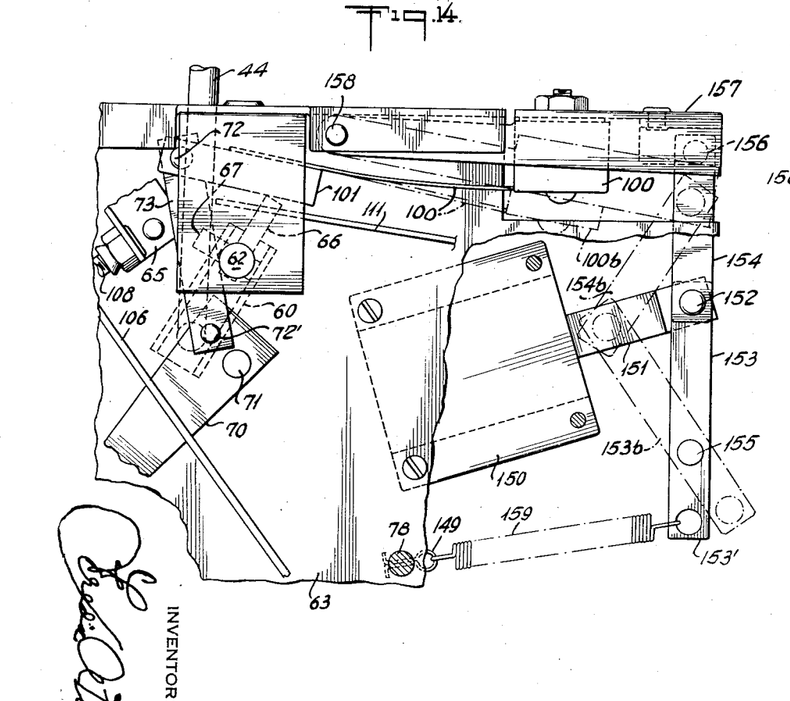
Figure 14 is a fragmentary view similar to Figures 4 and 12 showing a modification of an alternative safety device.
Figure 15:
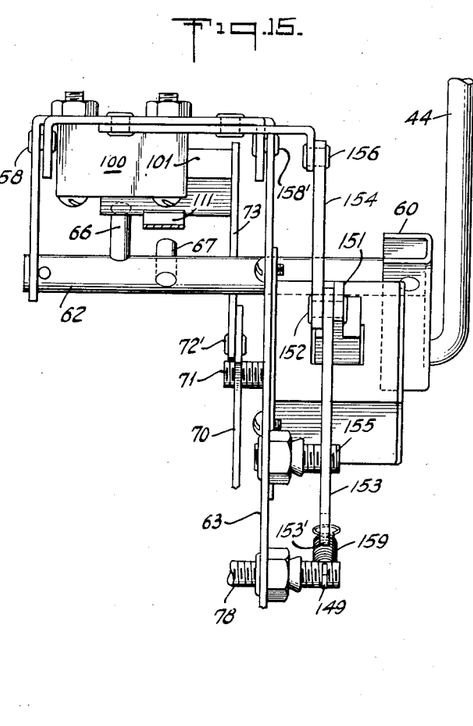
Figure 15 is a side view of Figure 14.

A method for reversing the door-drive to retract upward a door that may be moving downward when a car comes within capacitance-range (an instantly reversing motor being used), is provided through an alternative solenoid 150, Figs. 14 and 15, mounted on frame 63. Plunger 151 of this solenoid connects to a pivot 152 which forms a joint with two links, one, 153, supported on frame 63 by stud 155 and pivoting on this stud, the other, 154, supporting at pivot 156 a trap 157 which pivots at 158 and 158' on frame 63 and carries the body of reversing switch 100. Into an extension 153' of link 153 one end of a spring 159 is engaged, the other end being held to frame 63 by cotter-pin 149 through stud 78. Normally this spring holds links 153 and 154 in vertical position shown, to support switch 100 in upward position where it operates the same as when rigidly held to the top of frame 63, already described. The body of switch 100 is drawn into downward position 100b upon solenoid 150 drawing links 153 and 154 into positions 153b and 154b when energized by a car coming within capacitance-range. In position 100b of switch-body, handle 100' assumes its normal straight line in which the polarity of motor 30 is reversed to effect door-opening. Thus, without changing the raised position of pad 101, and without a swing-through of rocker 70 and tappet 75, that would open switch 105, motor continues to run but takes the reverse direction to drive door upward.

When car moves out of capacitance-range, switch 100 is restored to normal by spring 159 bringing links 143 and 144 back to vertical.

Operation.—Normal use

Approaching the garage with car's headlamp lighted, the driver steers slightly toward that side of door-frame in which is imbedded the cylinder containing the light-sensitive cell, and thus brings one headlamp's beam to bear upon the cell. Upon reaching a prescribed approximate distance from the garage, driver veers into line to enter garage, carrying headlamp beam away from door-frame and cell. Withdrawal of the beam from cell corresponds to extinguishment of the beam. Extinguishment or withdrawal of light is an essential in setting up an actuation of door, and this must be done within a limited period of time, as not less than two seconds, to distinguish from lightning, or not more than seven seconds, distinguishing from continuous light, such as sunlight.

An alternative procedure is for the driver to bring the car's headlamp into a prescribed position directed to the cell, turn on the headlamp beam, and turn it off within the essential time-period.

The lighting of cell 15 admits electric current to energize relay 120 which, through the contacts 121, 122, closes circuits to solenoid 90 and timing-clock 80, causing timing-clock to turn horn disc and causing solenoid to clutch pawl-carrier to turn with the horn-disc. Nose of pawl 95 thus is carried in about two seconds off shelf 106' of lever 106, and is snapped by spring 96 into position 95b, Figure 11, in which the tail of pawl is stopped against tappet-end 75' at bracket 76 with its nose set to engage lever 106 below the shelf. Travel clockwise by pawl through about seven seconds of time is allowable within which an extinguishment of light at cell will stop the flow of current to relay, open the circuit to solenoid 90 and to timing-clock 80, thus releasing clutch, and permitting pawl-carrier to snap counter-clockwise under pull of spring 98 to throw lever 106 and switch 105 to energize the door-drive motor to drive the door closed if open, or to drive it open if closed.

Operation.—Cancellation of sporadic light

If headlamp light, or any light such as sunlight, is applied for a period such as 8 to 10 second, long enough to bring pawl 95 into contact with bracket 76, pawl will be thrown into position 95c, Fig. 11, in which a straight line between the ends of spring 96 will come below the pivots 88. Pawl then is held by spring 96 from getting into contact with lever 106 below shelf 106' of that lever when light is withdrawn or extinguished and a counter-clockwise movement of pawl-carrier ensues under pull of spring 98. But in such movement pawl is tipped as it contacts tripper 74 at a stage when its nose will register above shelf 106', where it comes to rest without effecting a throw of lever 106 and of switch 105. Thus the effect of sunlight, or other continuous light, is cancelled. Momentary light-flashes, as of lightning, are cancelled also by the requirement that the light must be sustained about two seconds to bring pawl 95 clear of shelf 106'.

Operation.—Safety-period of headlight-ineffectiveness

Upon the door having reached open position, it is desirable that a closing should not occur until the expiration of a time-period within which car may be brought fully into garage. A driver, having kept the car standing with headlamp aimed at cell while door was opening, might turn on headlamps before moving the car to go through doorway. This, followed by car-movement withdrawal of the headlamp-beam, could set door to closing. Or another car, following to park or otherwise, and extinguishing headlight, could have the same effect. Or, upon driver having taken car out of the garage, and having provided for door-closing from headlamp beam, a period of light-ineffectiveness is of value to avoid re-opening the door when maneuvering car in driveway.

The time-period may be derived according to the number of horns on horn-disc 85 in relation to the speed of the timing-clock. With two horns diametrically opposite, and a speed of 1 r.p.m., the period would be 30 seconds, minus the pawl-drive run of horn-disc.

Upon door reaching open or closed position, lever 111 of switch 110 is lifted by cam 67, and latched by latch 77, to open circuit to cell and relay, and to close circuit through contact 114' to timing-clock (but not to solenoid) to drive horn-disc clockwise through the time-period (while having no clutching or driving effect upon pawl-carrier). Lever 111 is unlatched at the end of the time-period by the horn that first reaches latch 77. This horn presses the latch 77 to release lever 111 and open the circuit to timing-clock, and close the circuit through contact 114 to cell and relay. Thus, with door having gone into a closed position, relay 120 may admit of door-operation only after the expiration of the time-period, when the possibility of an unwanted re-opening of the door by automobile headlamp beam has been substantially removed, the maneuvering in driveway having been finished, and the car having departed; or, with door in an open position, relay may admit of door-operation only after the expiration of the time-period, after the car has been brought into garage, and possibility has been avoided of an unwanted closing of door by auto headlamp beam withdrawal or extinguishment.

Having opened the circuit of switch 110 through contact 114', and thus having stopped timing-clock and horn-disc, the horn (except for possible coasting of timing-clock under momentum) will not turn far enough to get clear of the bottom end of latch 77. And relatching of switch 110 is prevented until the horn gets clear. A re-latching is not needed until the door has gone through a movement to open or to close. The timing-clock (but not the solenoid) is wired to one tab of switch 105, as noted, so that, whenever the door-drive motor runs, the timing-clock runs. The horn moves with the timing-clock when door starts its movement to close or open, and latch 77 is freed of horn to re-latch lever 111 and switch 110 immediately the door-movement ends.

Operation.—Self-closing of door

In self-closing the safety period of headlight-ineffectiveness runs for the time chosen as the speed of timing-clock in making a revolution at its shaft. This period applies after each opening of the door, whether car is to enter or leave the garage. No period of ineffectiveness is needed after door has closed, the car's headlight will have been removed from the area in which it could be effective.

For self-closing, as shown in Fig. 10, the horn-discs 85, 86 are each provided with a notch 85", 86" respectively. Obviously latch 77 may be dispensed with, and cam 67 is put into cam-shaft 62 at the same angle as is cam 66, the two cams then being in line. When door reaches open position, cam 67 holds lever 111 upward (without latch 77) until door later gets back into closed position and releases lever 111. While lever 111 is held upward, current through switch 110 to relay 120 through contact 114 is cut off (producing ineffectiveness by headlamp of car, and precluding clutching by solenoid), and current is supplied to timing-clock, through contact 114', so that timing-clock runs until door closes. The horn on horn-disc goes through a revolution near the end of which it throws lever 116 to actuate the warning signal for door-closing about ten seconds before door-movement starts. At this point notches 85" and 86" line up with pawl 99, and interposer springs into the notches, the position shown in Figure 7. Horn-disc, continuing, brings its notch-edge 85" clockwise to bear against interposer, and interposer to bear against notch-edge 86", shifting pawl-carrier 86 clockwise to draw pawl off shelf 106', poised to retract under pull of spring 98, and to throw lever 106 and switch 105 to start the motor to close the door. The retraction and the throw of switch occurs when horn-disc and pawl-carrier have moved far enough to extricate the interposer from between them, the interposer being rooted in a stationary base.

Notch 86" of horn-disc now is clockwise past the interposer. Horn-disc and timing-clock are not reversible counter-clockwise. Accordingly, upon door next reaching open position, notch 86" must travel substantially a full circle (a desired period) before the notches and interposer can line up together for door-closing.

Sunlight occasions clutching through solenoid, and moves and holds pawl-carrier to bracket 76, with notch 86" clockwise past the interposer. So, under continuous light, the notches cannot line up with interposer to cause door-operation.

Operation.—Cushioning of door-stoppage

Cushioning of door-stoppage as door approaches open position has been observed under this caption in the mechanical description. Cushioning as the door approaches closed position has a further essential feature. In the first three-quarters of the 120° throw of cam-shaft 62, cam 66 moves idly from its position as seen in Figure 4 to the position at which it comes into contact with pad 101; and in the last quarter of rotation, through about 30°, the raising of pad and leaf-spring handle 100' is effected. On the return of pad and handle from raised position when door approaches the termination of its closing movement, the effective release of pad 101 occurs within a corresponding 30° of initial movement, while the final 90° of movement is idle of function. It is by confining effectiveness to the first quarter, or 30°, of this movement that the motor is de-energized and retardation of door-movement into closed position is commenced well in advance of the door reaching fully closed position. This applies not only to the wood door here illustrated, but to the door of plastic or other composition which is the subject of my application, Serial Number 589,910. Motor is de-energized when the movement of cam 67 is half way through its effective 30° of movement, that is, through 15° of movement, one-eighth of the whole 120°. 30° of movement produces a complete swing-through of rocker 70 and of tappet 75. Half way through this swing tappet 75 is at its lowest reach, depressing tail of pawl 95 to release lever 106 and open switch 105 to de-energize the motor.

Operation.—Protection of door-drive motor against overheating

The time-period through which motor 30 runs to open or close the door is about 5 seconds. The grip-sheave allows motor to run against friction while door is immobilized, as by ice at sill or by other obstructions. But the motor could overheat in a long resisted run. Provision is made to protect the motor against any run longer than about 12 seconds. Pin 97 has been observed as extending rightward of Figures 5 and 8 into the path of horns 85'. Timing-clock runs when motor runs; likewise either horn. About 75° along in the arc of its run the horn depresses pin 97 of pawl in position 95b, and moves pawl clear of lever 106 below shelf 106' into position above shelf 106', freeing lever 106 and switch 105 to open the circuit at switch 105 to stop the motor. Thus the motor will stop about 12 seconds after each time it is started, and until the cause of door's immobilization has been removed. The usual period to overheat a motor under over-load is about half an hour.

I claim:

1. In a light sensitive control for an electric motor circuit for delivering current to the motor, a light-sensitive cell, a relay, a relay-energizing circuit between the cell and the relay, a solenoid for clutching two clutch elements when energized and declutching them when de-energized, an electrically driven timing-clock, secondary circuits from the relay to solenoid and timing-clock, a switch in said motor circuit, a first clutch-element on the timing-clock, a second clutch-element for engaging and moving in one direction, when clutched by the solenoid, in timed relation to the first clutch-element, and a retractor for moving said second clutch-element in the opposite direction, when declutched by the solenoid, to throw the said motive-switch.

2. In a door-operator, a motor, driving connections between motor and door for driving door open and closed, a circuit for the motor and a motor-switch in the circuit, an electrically driven timing-clock with rotatable shaft for rotating, through a prescribed time-period after door has opened, a first driven member fastened to the shaft, a second driven member rotatable freely on the first driven member, parts associated with the second driven member for controlling the said motor-switch to drive the door open and closed, and an interposer arranged to engage the first driven member with the second driven member at the expiration of the said time-period for driving the second driven member into position for closing throw of the said motor-switch.

3. In a door-operator, a motor for driving the door, driving connections between motor and door, setting off means for setting off the motor from the headlamp of an automobile to drive the door open and closed and a circuit therefor, a circuit for the motor and a switch in the circuit, controls for the switch including a timing-clock with shaft, a driven member on the shaft, a clutch between timing-clock and said controls, a release for the clutch, and parts associated with said driven member for holding open the circuit to said setting off means for a prescribed period of time.

4. In a door-operator, a motor, driving connections between motor and door to drive the door open and closed, a circuit to the motor and a switch in the circuit, switch controls for starting and stopping the motor, an electrically driven timing-clock and parts driven by the clock for operating said switch controls in a normal sequence, said parts driven by the timing-clock including means for stopping the motor in case of failure of said switch controls normally to stop the motor.

5. In a door-operator, a motor for driving the door, a load-circuit to the motor and a power-switch in the load-circuit, a double pole relay for closing and opening two circuits simultaneously, a solenoid, a timing-clock, a solenoid-circuit from one said pole to said solenoid, a timing-circuit from the other of said poles to said timing-clock, a first clutch element on the timing-clock, a second clutch element for clutching the first clutch element, means carried by the second clutch element for actuating said power-switch, connections from the solenoid for clutching the said two clutch elements when solenoid is energized and for declutching when solenoid is deenergized, a light sensitive cell for energizing said relay when lighted and deenergizing said relay when darkened, a circuit from the cell to the energizing coil of the relay, solenoid and timing-clock means in unison for switch-throwing poising of said means for actuating said power switch when light is applied to said cell, and a retractor for power-switch closing drive of said means for actuating said power switch when light is withdrawn from said cell.

6. In a light sensitive control system, electrically powered apparatus, a circuit therefor and a switch in the circuit, a pawl for closing the switch, an electrically driven timing-clock and shaft carrying said pawl for measuring a predetermined travel period of said pawl, and means for switch-closing actuation of said pawl within the travel period, said means including a light sensitive cell, and a relay having its energizing coil in series with the cell and having a circuit for controlling the timing-clock.

7. The combination of claim 6 with means for disabling said pawl upon travel beyond the predetermined travel period.

8. In a light sensitive control for an electric motor having a circuit for delivering current thereto, a first switch and a second switch in said circuit, a light sensitive cell, a relay, said relay being operatively connected to said first switch, a relay energizing circuit connecting said light sensitive cell and said relay for actuating said relay to actuate said first switch when light is applied to said cell, an electrically driven timing clock, an electric circuit for said timing clock connected to said first switch, a pawl operatively connected to said second switch, positioning means operable within a limited period of operation of said timing clock for positioning said pawl to close said second switch, and means operable upon extinguishment of applied light to said light sensitive cell to cause said positional pawl to close said second switch.

9. A light sensitive control, as recited in claim 8, including means for releasing said positioned pawl from operative connection with said second switch without operation thereof when application of light to said light sensitive cell extends beyond a prescribed time interval.

10. In a light sensitive control for an electric motor having a circuit for delivering current thereto, a first switch and a second switch in said circuit, a light sensitive cell, a relay, said relay being operatively connected to said first switch, a relay energizing circuit connecting said light sensitive cell and said relay for actuating said relay to actuate said first switch when light is applied to said cell, an electrically driven timing clock having a shaft, an electric circuit for said timing clock connected to said first switch, a solenoid, an electric circuit for said solenoid connected to said first switch, a first clutch element connected to said shaft of said timing clock, a second clutch element engageable with said first clutch element, a clutch operator connected to said second clutch element and to said solenoid to engage said second clutch element with said first clutch element when said solenoid is energized and disengaging said clutch elements when said solenoid is de-energized, an operator connected at one of its ends to said second switch and in operative engagement at its opposite end with said second clutch element when said second clutch element is in engagement with said first clutch element and driven by said timing clock to operate said operator and said second switch in one direction, said first clutch element and said timing clock driving said second clutch element in one direction when said clutch elements are engaged, and means connected to said second clutch element to return said second clutch element in the opposite direction when disengaged from said first clutch element, to operate said operator and said second switch in the opposite direction.

References Cited in the file of this patent

UNITED STATES PATENTS

| | | |
|---|---|---|
| 2,149,177 | Miller | Feb. 28, 1939 |
| 2,596,591 | Parkard et al. | May 13, 1952 |
| 2,641,713 | Shive | June 9, 1953 |
| 2,676,294 | Wilcox | Apr. 20, 1954 |
| 2,695,977 | Hupert et al. | Nov. 30, 1954 |
| 2,720,284 | Galanty | Oct. 11, 1955 |
| 2,750,453 | Pritchard | June 12, 1956 |
| 2,758,836 | Purdy | Aug. 14, 1956 |
| 2,760,134 | Johnson | Aug. 21, 1956 |